(12) United States Patent
Fox et al.

(10) Patent No.: US 8,203,235 B2
(45) Date of Patent: Jun. 19, 2012

(54) AC AND DC UNINTERRUPTIBLE ONLINE POWER SUPPLIES

(75) Inventors: Bret P. Fox, Sunbury, OH (US); Paul Taylor, Westerville, OH (US); Peter A. Panfil, Columbus, OH (US); Russell E. Shelter, Jr., Delaware, OH (US)

(73) Assignee: Liebert Corporation, Columbus, OH (US)

( * ) Notice: Subject to any disclaimer, the term of this patent is extended or adjusted under 35 U.S.C. 154(b) by 579 days.

(21) Appl. No.: 12/388,078

(22) Filed: Feb. 18, 2009

(65) Prior Publication Data

US 2009/0256422 A1 Oct. 15, 2009

Related U.S. Application Data

(60) Provisional application No. 61/044,199, filed on Apr. 11, 2008.

(51) Int. Cl.
*H02J 9/00* (2006.01)
(52) U.S. Cl. ......................................................... 307/64
(58) Field of Classification Search ...................... 307/64
See application file for complete search history.

(56) References Cited

U.S. PATENT DOCUMENTS

| | | | |
|---|---|---|---|
| 4,114,048 A | 9/1978 | Hull et al. | |
| 4,158,163 A * | 6/1979 | Eriksen et al. | 318/798 |
| 4,315,305 A * | 2/1982 | Siemon | 363/88 |
| 4,517,634 A * | 5/1985 | Sakai | 363/35 |
| 4,545,002 A * | 10/1985 | Walker | 363/37 |
| 4,780,802 A * | 10/1988 | Miyashita et al. | 363/37 |
| 4,860,185 A * | 8/1989 | Brewer et al. | 363/41 |
| 5,347,164 A | 9/1994 | Yeh | |
| 5,612,580 A * | 3/1997 | Janonis et al. | 307/64 |
| 5,737,204 A * | 4/1998 | Brown | 363/89 |
| 5,744,932 A * | 4/1998 | Kissel | 320/106 |
| 5,767,591 A * | 6/1998 | Pinkerton | 307/64 |
| 6,288,916 B1 * | 9/2001 | Liu et al. | 363/37 |
| 6,507,507 B2 | 1/2003 | Tokunaga et al. | |
| 6,605,879 B2 * | 8/2003 | Wade et al. | 307/66 |
| 6,643,152 B2 | 11/2003 | Tokunaga et al. | |

(Continued)

FOREIGN PATENT DOCUMENTS

JP 11103540 A 4/1999

OTHER PUBLICATIONS

A Three Channels, Low Ripple PFC Rectifier Using a Standard Power Module; M. Meyer, Ch. Rufer; Industrial Electronics Laboratory, Swiss Federal Institute of Technology, 1015 Luasanne, 1999.

(Continued)

*Primary Examiner* — Adi Amrany
(74) *Attorney, Agent, or Firm* — Harness, Dickey & Pierce, P.L.C.

(57) ABSTRACT

A power supply includes a rectifier that converts an alternating current input voltage to a first direct current voltage. An inverter that converts the first direct current voltage to an alternating current output voltage. A first set of output terminals that receives the alternating current output voltage. A second set of output terminals that receives the first direct current voltage. A charging circuit that charges a backup power source based on the first direct current voltage. The rectifier receives a second direct current voltage from the backup power source based on the power supply operating in a predetermined condition.

48 Claims, 3 Drawing Sheets

U.S. PATENT DOCUMENTS

| | | | |
|---|---|---|---|
| 6,700,802 B2* | 3/2004 | Ulinski et al. | 363/37 |
| 6,788,029 B1* | 9/2004 | Gabrys | 322/4 |
| 6,906,933 B2* | 6/2005 | Taimela | 363/37 |
| 6,958,550 B2* | 10/2005 | Gilbreth et al. | 290/52 |
| 7,061,141 B2* | 6/2006 | Yamamoto | 307/65 |
| 7,239,043 B2* | 7/2007 | Taimela et al. | 307/66 |
| 7,265,650 B2 | 9/2007 | Jang et al. | |
| 7,403,364 B2* | 7/2008 | Anderson et al. | 361/79 |
| 7,432,615 B2* | 10/2008 | Hjort | 307/64 |
| 7,453,235 B2* | 11/2008 | Blair et al. | 320/116 |
| 7,579,714 B2* | 8/2009 | Okui | 307/64 |
| 7,652,393 B2* | 1/2010 | Moth | 307/64 |
| 7,679,943 B2* | 3/2010 | O'Bryant et al. | 363/65 |
| 7,763,990 B2* | 7/2010 | Lee | 307/26 |
| 7,800,924 B2* | 9/2010 | Oughton, Jr. et al. | 363/34 |
| 7,893,558 B2* | 2/2011 | Lee | 307/10.1 |
| 2003/0062775 A1* | 4/2003 | Sinha | 307/68 |
| 2005/0043859 A1* | 2/2005 | Tsai et al. | 700/286 |
| 2006/0022524 A1* | 2/2006 | Bryde et al. | 307/64 |
| 2006/0238031 A1* | 10/2006 | Frey | 307/64 |
| 2007/0184339 A1 | 8/2007 | Scheucher | |
| 2007/0188130 A1 | 8/2007 | Scheucher | |
| 2007/0188137 A1 | 8/2007 | Scheucher | |
| 2008/0053716 A1 | 3/2008 | Scheucher | |
| 2008/0197706 A1* | 8/2008 | Nielsen | 307/66 |
| 2009/0201703 A1* | 8/2009 | Klikic et al. | 363/41 |
| 2010/0008397 A1* | 1/2010 | Johnson, Jr. | 374/152 |

OTHER PUBLICATIONS

International Search Report and the Written Opinion of the International Searching Authority for PCT/US2009/037240.

* cited by examiner

AC AND DC UNINTERRUPTIBLE ONLINE POWER SUPPLIES

CROSS-REFERENCE TO RELATED APPLICATIONS

This application claims the benefit of U.S. Provisional Application No. 61/044,199, filed on Apr. 11, 2008. The disclosure of the above application is incorporated herein by reference in its entirety.

FIELD

The present disclosure is related to the structure operation and control of uninterruptible power supplies.

BACKGROUND

An uninterruptible power supply (UPS) prevents power irregularities, such as outages, surges, spikes, etc., from adversely affecting a load. A UPS typically includes a backup power source, such as a battery, that is used to supply power when power from a main power source is interrupted.

One example UPS has an "online" configuration and includes a rectifier and an inverter. The rectifier and inverter are connected in series between a main alternating current (AC) source and an AC load. The rectifier performs as an AC-to-direct current (DC) converter and the inverter performs as a DC-to-AC converter.

During normal operation, power is supplied to the AC load from the main AC source through the rectifier and the inverter. This provides regulated and filtered power with minimal irregularities, such as voltage spikes, frequency deviations or phase deviations. In one circuit topology, the rectifier provides power to the inverter and to a battery charger via a DC bus. The rectifier may be a pulse width modulated rectifier. The battery charger charges a backup battery. In another topology, when the backup battery is directly connected to the DC bus, the rectifier may be a phase controlled rectifier and be used to charge the battery backup without use of a separate battery charger.

Continuing from the same example, when power from the main AC source is interrupted, power is supplied from the battery to the rectifier instead of from the main AC source. The rectifier performs as a DC-to-DC boost converter and boosts DC power from the battery to the inverter to power the AC load. This allows power to be maintained on the AC load without interruption. When the battery backup is directly connected to the DC bus and when the power from the main AC source is interrupted, power is supplied directly from the battery to the DC bus and not through the rectifier. The described UPS provides uninterruptible clean AC power and DC power. The voltage provided to the AC load is regulated. The voltage provided to the DC bus by the battery backup is not regulated and decreases as energy is drawn from the battery.

Another UPS has an "offline" configuration and includes relays that are coupled in series between a main AC source and an AC load. Power is provided through the relays to the AC load. Power is also provided from the relays to a DC load via a transformer and an AC-to-DC rectifier.

During normal operation, power is provided to the AC load through the relays and to the DC load through the relays, the transformer and the rectifier. Power is also supplied from the transformer to a battery charger to charge a battery. When power from the main AC source is interrupted, the relays are enabled and power is provided to the transformer from the battery via an inverter instead of from the main AC source. Power from the transformer is supplied to the relays to power the AC load and to the rectifier to power the DC load.

Although the offline configured UPS provides both AC and DC power outputs, power supplied to the AC load is primarily supplied directly from an unfiltered and regulated utility power source.

SUMMARY

In one embodiment, a power supply is provided having the following components. A rectifier converts an alternating current input voltage to a first direct current voltage. An inverter converts the first direct current voltage to an alternating current output voltage. A first set of output terminals receives the alternating current output voltage. A second set of output terminals receives the first direct current voltage. A charging circuit charges a backup power source based on the first direct current voltage. The rectifier receives a second direct current voltage from the backup power source based on the power supply operating in a predetermined condition.

In other features, a method of operating a power supply is provided and includes converting an alternating current input voltage to a first direct current voltage. The first direct current voltage is converted to an alternating current output voltage. The alternating current output voltage is received by a first set of output terminals. The first direct current voltage is received by a second set of output terminals. A backup power source is charged based on the first direct current voltage. A second direct current voltage is supplied from the backup power source to a rectifier based on the power supply operating in a predetermined condition.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
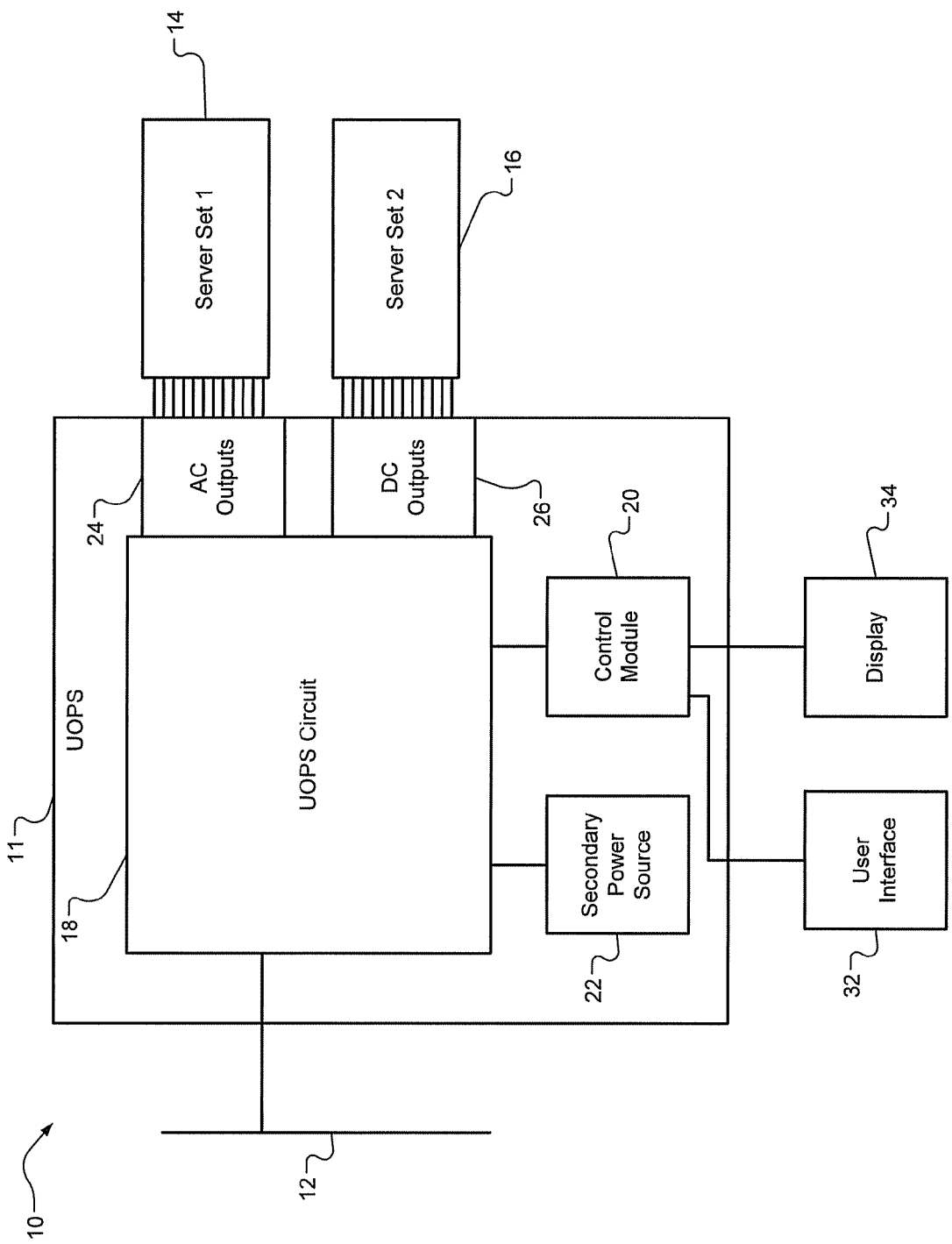
FIG. 1 is a functional block diagram of an uninterruptible online power supply (UOPS) in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Also, in the following description, terms such as "first", "second", and "third" are used. These terms are not specific to any one device, voltage, current, etc. More than one of the terms may be used to refer to the same device, voltage, current, etc. depending upon the context.

In addition, in the following description various variable labels are disclosed. The variable labels are provided as examples only. The variable labels are arbitrarily provided and may each be used to identify or refer to different items. For example, the variable label N may be used to refer to a number of input terminals or to a number of output terminals of an uninterruptible online power supply (UOPS).

The embodiments of the present disclosure provide UOPSs that each provide AC and DC outputs. The UOPSs are capable of providing DC power while providing AC power. The embodiments disclosed herein also provide numerous control, power limiting and dynamic power flow adjustment techniques. U.S. Pat. No. 6,917,124, entitled "Uninterruptible Power Supply" is incorporated by reference herein in its entirety. The UOPS of the present disclosure may include features of the uninterruptible power supplies of U.S. Pat. No. 6,917,124.

Referring now to FIG. 1, an UOPS system 10 that includes a UOPS 11 is shown. The UOPS 11 receives AC power from a main AC source 12, such as an AC power line. For example only, the UOPS 11 supplies AC power to a first server set 14 and DC power to a second server set 16. The UOPS 11 may supply AC power and DC power to network switches and devices, telecommunication switches and devices, audio/video hubs and devices, air conditioning units, medical devices and equipment, industrial devices and equipment, etc.

The UOPS 11 includes an UOPS circuit 18, a control module 20, and a secondary power source 22. The UOPS circuit 18 is in an online arrangement with respect to the main AC source 12 and AC and DC load terminals 24, 26. The online arrangement refers to the rectifying, regulating, and converting of power between the main AC source 12 and the AC and DC load terminals 24, 26. The UOPS circuit 18 removes and/or minimizes voltage and current irregularities to provide clean AC and DC power.

The UOPS circuit 18 supplies AC and DC power to the AC and DC load terminals 24, 26. The UOPS circuit 18 provides this power based on power from the main AC source 12 or based on power from the secondary power source 22. The secondary power source 22 is used during one or more predetermined conditions, such as when power from the main AC source 12 is interrupted, noisy, has a voltage amplitude that is less than or greater than a predetermined voltage amplitude, is in a predetermined state, etc.

The control module 20 may include a digital signal processor with embedded software that detects current, voltage and power parameters in the UOPS circuit 18. The control module 20 monitors the inputs and outputs of the UOPS circuit 18, and controls operation of the UOPS circuit 18 based on the inputs and outputs of devices and circuit elements of the UOPS circuit 18. The control module 20 may control operation of rectifiers, inverters, chargers and other circuit elements, such as switches and relays, of the UOPS circuit 18. The control module 20, for example, maintains voltage and current levels on the AC and DC load terminals 24, 26. The control module 20 also limits current supplied to the AC and DC load terminals 24, 26. The control module 20 may provide limits, set fault conditions, set event conditions, and set alarm conditions. Other features of the control module 20 are described below.

The first and second server sets 14, 16 may include any number of computers and/or servers. The first server set 14 operates based off of AC power. The second server set 16 operates based off of DC power.

The UOPS system 10 may also include a user interface 32 that is in communication with the control module 20 and may provide input settings for system parameters. The user interface 32 may be used to set voltage levels, current limitations, and power limitations for the AC and DC load terminals 24, 26 and other terminals, such as main AC source terminals associated with the main AC source 12. The AC and DC load terminals 24, 26 may be regulated, monitored, adjusted, and limited separately and independently of each other or in a dependent manner. As a dependent example, the user interface may be used to adjust an AC-to-DC current ratio and/or an AC-to-DC power ratio. These ratios refer to the permitted current and/or power supplied to the AC and DC load terminals 24, 26. For example, 50% of the power from the main AC source 12 may be provided to the AC load terminals 24 and 50% to the DC load terminals 26. Other ratios may be set.

The UOPS system 10 may also include a display 34, which may be used to indicate the voltage, current, and power statuses of the inputs and outputs of each device of the UOPS circuit 18. A user may perform appropriate tasks based on the displayed information.

Figure 2:
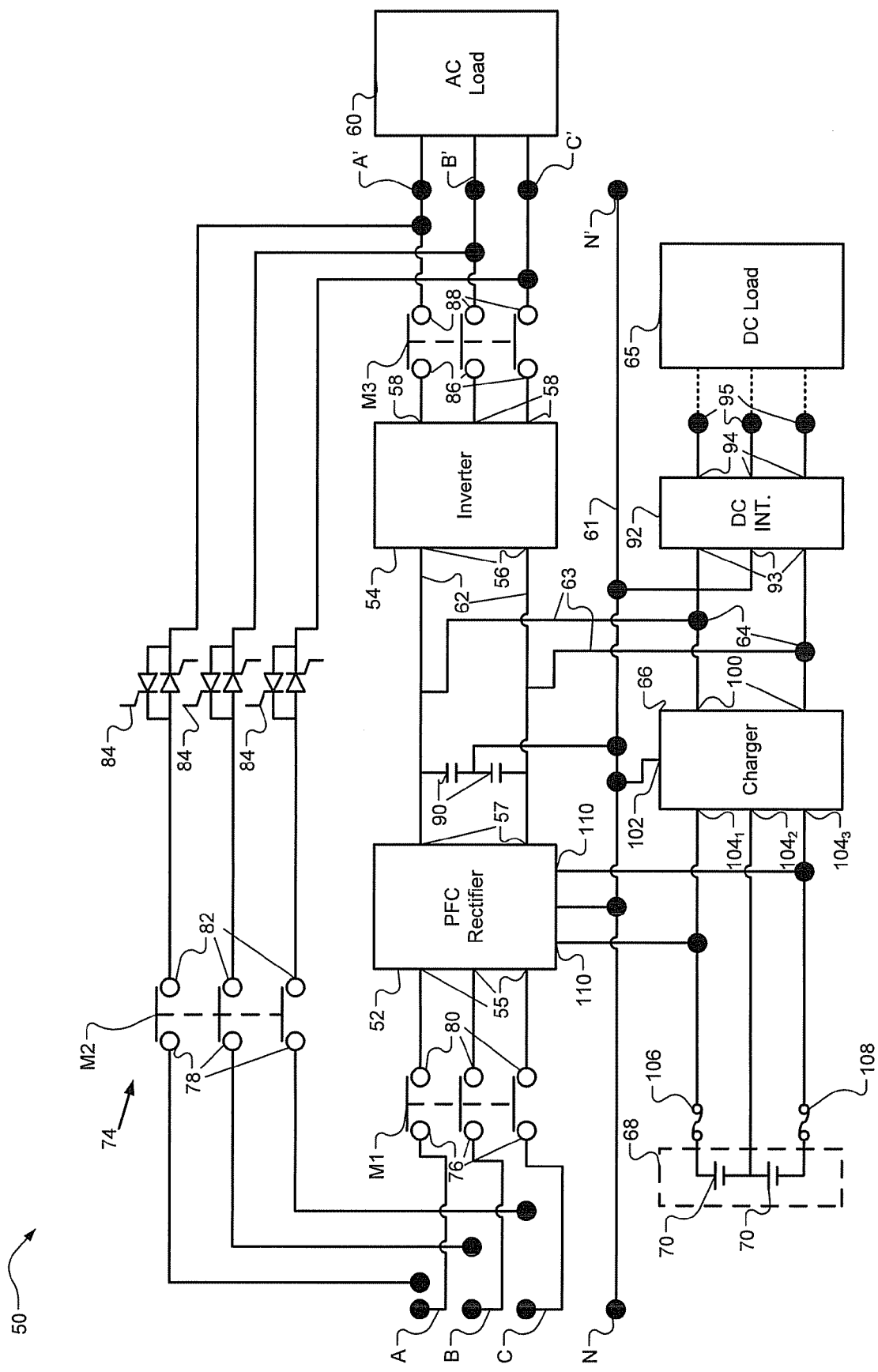
FIG. 2 is a functional block diagram of an UOPS in accordance with an embodiment of the present disclosure.

Referring now also to FIG. 2, a UOPS circuit 50 is shown and includes a power factor correction (PFC) rectifier 52 and an inverter 54. The PFC rectifier 52 and the inverter 54 are connected in series between AC source (input) terminals A, B, C, N and AC load (output) terminals A', B', C', N', which may be referred to as a first set of output terminals. The UOPS circuit 50 may be included as part of the UOPS circuit 18 of FIG. 1. The PFC rectifier 52, the inverter 54, and other circuit elements of the UOPS circuit 50 may be controlled by the control module 20. The topology of the UOPS circuit 50 of FIG. 2 is provided for example purposes only, the embodiments disclosed herein may apply to other power supply topologies. Other topology examples are described below.

The PFC rectifier 52 and the inverter 54 include respective AC and DC inputs 55, 56 and outputs 57, 58 that receive and output respective AC and DC voltages. The PFC rectifier 52 converts an AC input voltage to a DC voltage. The inverter 54 converts the DC voltage to an AC output voltage. The PFC rectifier 52 may perform pulse width modulated rectification. The AC source terminals A, B, C, N receive power from a main AC source. The AC load terminals A', B', C', N' supply AC power to the AC load 60. The AC source terminal N and the AC load terminal N' are connected to a neutral bus 61. DC supply lines 62, which may be referred to as the DC bus, extend in parallel between the PFC rectifier 52 and the inverter 54. DC load lines 63 extend in parallel from the DC supply lines 62 to a first set of DC load terminals 64, which may be referred to as a second set of output terminals. The DC load lines 60 supply power to a DC load 65 and may be included in connectors or a terminal block.

The UOPS circuit 50 also includes a charger 66 (charge circuit) and a secondary power source 68, which may include one or more batteries 70. The secondary power source may in addition to or as an alternative to the batteries 70 include fly-wheels, ultra-capacitors, fuel cells, etc. The charger 66 is connected to and receives power from the PFC rectifier 52 and charges the secondary power source 68. In another topology, the secondary power source 68 is directly coupled to the DC bus 62 and the charger 66 is not incorporated. In this topology, the secondary power source 68 may be charged directly via the PFC rectifier 52. The PFC rectifier 52 may perform phase controlled rectification rather than pulse width modulated rectification.

The DC bus 62 may require a higher DC potential than the DC potential of the secondary power source 68. For this reason, the PFC rectifier 52, when in a backup mode or a supplemental power mode, may perform a boosting function to increase the DC source voltage of the secondary power source 68 up to the DC voltage of the DC bus 62.

The AC load terminals A', B', C', N' and the first set of DC load terminals 64 receive power originated from the AC source terminals A, B, C, N during normal operation. The AC load terminals A', B', C', N' and the first set of DC load terminals 64 receive power originated from the secondary power source 68 during predetermined conditions. Example predetermined conditions are when power from the AC source terminals A, B, C, N is interrupted, noisy, has a voltage amplitude that is less than or greater than a predetermined voltage amplitude, is in a predetermined state, etc.

The UOPS circuit 50 includes a first relay M1, a second relay M2, and a third relay M3 that is part of a bypass static switch circuit 74. The relays M1, M2 and M3 may be replaced with and/or include circuit breakers, fused disconnect switches, etc. The first relay M1 is connected in series between the AC source terminals A, B, C, N and the PFC rectifier 52. The second relay M2 is connected in series between the AC source terminals A, B, C, N and the AC load terminals A', B', C'. The bypass circuit 74 is in a bypass condition when the second relay M2 is closed. The AC load terminals A', B', C', N' may receive an AC output voltage from the inverter 54 when the second relay (M2) (bypass switch) is in the bypass condition corresponding to the coupling of an AC input voltage at the AC source terminals A, B, C, N to the AC load terminals A', B', C', N'. The first relay M1 may prevent the AC input voltage from being received by the rectifier 52 when the bypass circuit 74 is in the bypass condition corresponding to the coupling of the AC input voltage to the AC load terminals A', B', C', N'.

The third relay M3 is connected in series between the inverter 54 and the AC load terminals A', B', C'. The relays M1-M3 include 3-phase switches with corresponding input and output terminals for each of 3 phases. As shown, the AC source terminals A, B, C are connected to a first set of input switch terminals 76 of the first relay M1 and to the second set of input switch terminals 78 of the second relay M2.

A first set of output switch terminals 80 of the first relay M1 is connected to inputs 55 of the PFC rectifier 52. A second set of output switch terminals 82 of the second relay M2 are each connected to a silicon-controlled rectifier (SCR) 84. Each of the SCRs 84 is part of the bypass static switch circuit 74 and is connected to the AC load terminals A', B', C'. A third set of input switch terminals 86 of the third relay M3 is connected to the outputs 58 of the inverter 54. A third set of output switch terminals 88 is connected to the AC load terminals A', B', C'.

The DC supply lines 62 perform as a DC bus and provide DC power to the inverter 54 and to the DC load terminals 64. One or more capacitors 90 may be in series between the DC supply lines 62. The capacitors 90 filter and regulate DC current on the DC supply lines 62.

A DC interrupter 92 may be connected between the DC supply lines 62, the neutral bus 61 and the DC load 65. The DC load lines 63 and the neutral bus 61 may be directly connected to inputs 93 of the DC interrupter 92. Outputs 94 of the DC interrupter 92 are connected to a second set of DC load terminals 95. The second set of DC load terminals 95 may include a positive DC terminal, a negative DC terminal and a neutral terminal. The DC load 65 may be coupled to and operate based on one or more of the second set of DC load terminals 95. The DC load 65 may be coupled to and operate based on all of the terminals in the second set of DC load terminals 95. DC loads may be connected between any two terminals of the second set of DC load terminals 95. The DC interrupter 92 may include one or more fuses, circuit breakers, switches, relays, etc.

The DC interrupter 92 may be used to prevent or limit current passage to the DC load 65 during predetermined conditions. For example, the DC interrupter 92 may limit current passage when current supplied to the AC load terminals A', B', C', N' and/or current supplied to the DC load terminals 95 is greater than or equal to respective predetermined limits. The DC interrupter 92 may be controlled by the control module 20.

A DC voltage regulator (not shown) may be coupled between the DC bus 62 and the DC interrupter 92 and/or between the DC interrupter 92 and the second set of DC load terminals 95. When the DC bus 62 is supplied power from the secondary power source 68, the DC voltage regulator may be used to provide a regulated DC voltage to the second set of DC load terminals 95.

The charger 66 includes two DC inputs 100, a neutral terminal 102, and three DC outputs $104_{1-3}$. The DC inputs 100 are connected respectively to the DC supply lines 62. The neutral terminal 102 is connected to the neutral bus 61. The DC outputs $104_{1-3}$ are respectively connected to input terminals of the secondary power source 68.

The secondary power source 68, as shown, includes two batteries 70 connected in series. The first battery is connected to the first and second DC outputs $104_{1-2}$. The second battery is connected to the second and third DC outputs $104_{2-3}$. A first fuse 106 may be connected between the first battery and the first DC output $104_1$. A second fuse may be connected between the second battery and the second DC output $104_2$.

The PFC rectifier 52 also includes DC inputs 110, which are respectively connected to terminals of the secondary power source 68 and/or to the DC outputs $104_{1-3}$. The PFC rectifier 52 may receive and/or may be supplemented with DC power via the DC inputs 110 when power received from the AC source terminals A, B, C, N is reduced.

Although not shown the UOPS circuit 50 may include current transformers, attenuation circuits, dividers, amplifier circuits, etc. for detecting and monitoring voltages and currents supplied to and provided from the devices of the UOPS circuit 50. The detected currents and voltages may be monitored by a control module, such as the control module 20. For example, inputs and outputs of the PFC rectifier 52, the inverter 54, the charger 66, and the secondary power source 68, as well as the state of the relays M1-M3 and the DC interrupter 92, may be monitored.

The control module may receive inputs from or monitor state of the devices of the UOPS circuit 50. The control module regulates, adjusts, and limits the voltages, currents and power levels on the inputs and outputs of the devices based on one or more of the inputs and states of the devices. The control module may generate control signals that are transmitted to the PCF rectifier 52, the inverter 54, the charger 66, the secondary power source 68, the relays M1-M3 and the DC interrupter 92.

In operation, when in a normal mode, the PFC rectifier 52 regulates and converts power from the AC source terminals A, B, C, N to generate DC power on the DC bus 62. The relays M1 and M3 are in a closed state. The relay M2 is in an open state. The DC bus 62 supplies power to the inverter 54 ($1^{st}$ DC load) and to the DC load terminals 64 ($2^{nd}$ DC load). The inverter 54 performs as a DC-to-AC converter and converts DC power from the DC bus 62 to AC power for the AC load terminals A', B', C', N'. DC power is also provided to the charger 66 ($3^{rd}$ DC load). The charger 66 charges the secondary power source 68.

During one or more predetermined conditions, power out of the PFC rectifier 52 is supplemented or fully supplied by the secondary power source 68. Example predetermined conditions are when power from the AC source terminals A, B, C, N is interrupted, noisy, has a voltage amplitude that is less than or greater than a predetermined voltage amplitude, is in a predetermined state, etc. When power is pulled from the secondary power source 68 and not from the AC source terminals A, B, C, N, the UOPS circuit 50 operates in a backup mode. The PFC rectifier 52 performs as a DC-to-DC converter during the backup mode. When power is drawn from both the secondary power source 68 and from the AC source terminals A, B, C, N, the UOPS circuit 50 may operate in one of two supplemental power modes.

When in a first supplemental power mode, power (current) is supplied to both the AC load terminals A', B', C', N' and the DC load terminals 64 from the PFC rectifier 52. The PFC rectifier 52 may receive power from the AC source terminals A, B, C, N and from the secondary power source 68 simultaneously. The PFC rectifier 52 performs as an AC-to-DC converter for power from the AC source terminals A, B, C, N and performs as a DC-to-DC converter for power from the secondary power source 68. The bypass circuit 74 is disabled (relay M2 is in an open state and the SCRs 84 are in an OFF state).

When in a second supplemental power mode, power (current) is supplied to the AC load terminals A', B', C', N' from the bypass circuit 74 and from the PFC rectifier 52 via the inverter 54. The power may be provided by the bypass circuit 74 and the inverter 54 simultaneously. Each of the relays M1-M3 is in a closed state. Power may also be provided to the DC load terminals 62 from the PFC rectifier 52.

When power to the AC load terminals A', B', C', N' and DC load terminals 64 is supplemented or fully supplied by the secondary power source 68, the relay M2 may be maintained in a closed state. The relay M3 is maintained in a closed state. The relay M1 may be in an open or closed state. The relay M1 may be in an open state when preventing power from passing from the AC source terminals A, B, C, N to the PFC rectifier 52. Power is pulled from the secondary power source 68 to the PFC rectifier 52 and then used to supply the inverter 54 and the DC load 64. The charger 66 is in an OFF state when power is supplied from the secondary power source 68.

When the PFC rectifier 52 or the inverter 54 is operating inappropriately or when a fault condition exists between the AC source terminals A, B, C, N and the AC load terminals A', B', C', N', the bypass circuit 74 may be enabled. When enabled the relays M1 and M3 are in an open state and the relay M2 is in a closed state. AC power is supplied from the AC source terminals A, B, C, N through the SCRs 84 to the AC load terminals A', B', C', N'.

Voltage, current, and power limits may be predetermined and stored in memory and/or in the control module 20 for any of the terminals of the UOPS circuit 50. As an example, input voltage, current, and power limits may be set for the AC source terminals A, B, C, N, the inverter 54, the charger 66, and the secondary power source 68. As another example, output voltage, current, and power limits may be set for the PFC rectifier 52, the inverter 54, the AC load terminals A', B', C', N', and the DC load terminals 64. The PFC rectifier 52 and/or the control module 20 may limit current to the inverter 54.

Figure 3:
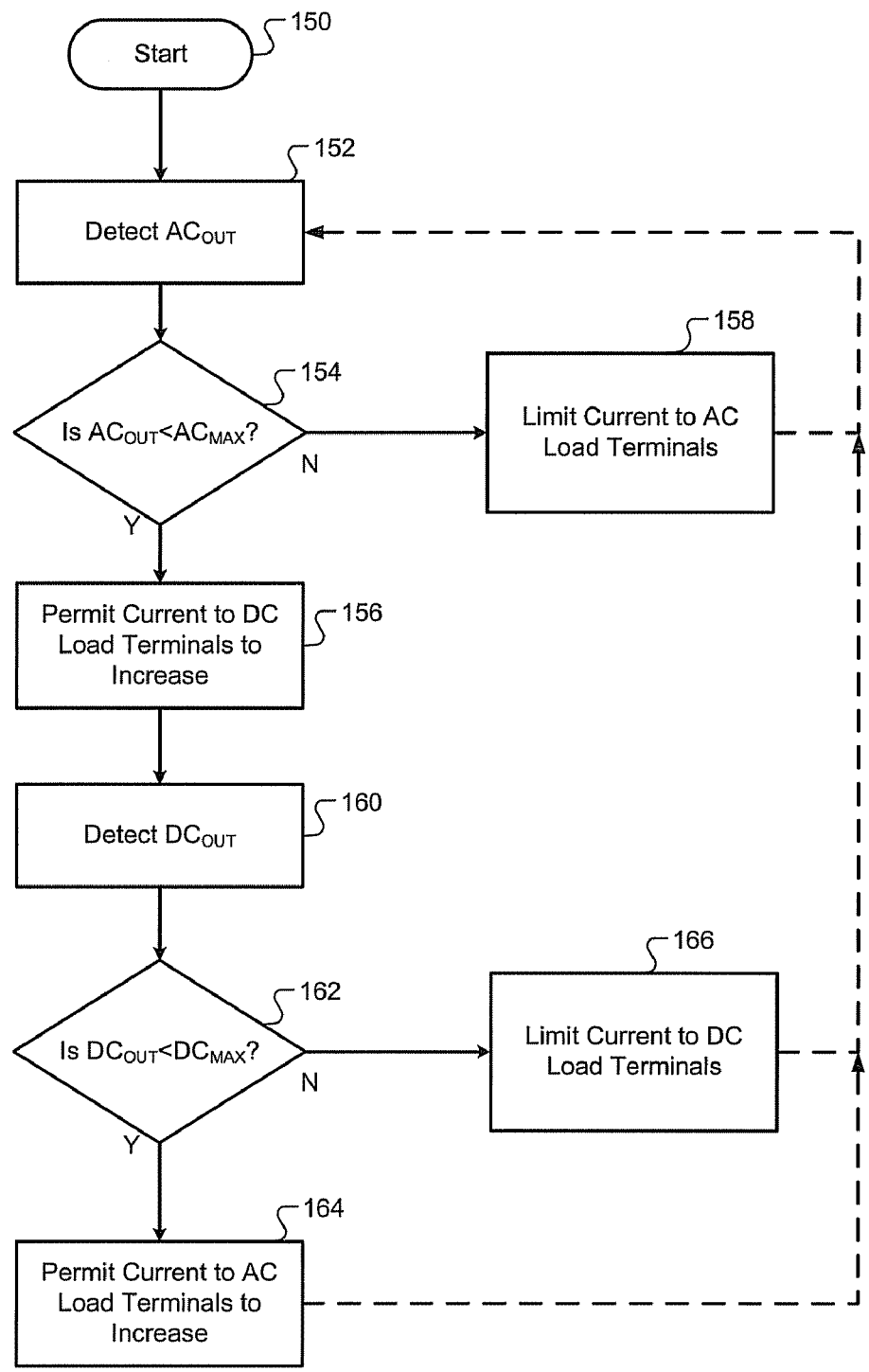
FIG. 3 is a flow chart of a method of operating an UOPS in accordance with an embodiment of the present disclosure.

Referring now also to FIG. 3, a method of operating a UOPS circuit is shown. Although the following steps are described primarily with respect to the embodiments of FIGS. 1 and 2, the steps may be modified to apply to other embodiments of the present disclosure. In the following steps various operations are described and may be initiated and/or controlled by a control module, such as the control module 20. The method may begin at step 150.

In step 152, AC load current $AC_{OUT}$ (current out of the AC load terminals A', B', C', N') is detected. The AC load current $AC_{OUT}$ is equal to the amount of current through the inverter 54. In step 154, the AC load current $AC_{OUT}$ is compared with a first predetermined limit $AC_{MAX}$. When AC load current $AC_{OUT}$ is less than the first predetermined limit $AC_{MAX}$, step 156 is performed, otherwise step 158 is performed.

In step 156, DC load current $DC_{OUT}$ (current out of the DC load terminals 64) to the DC load terminals 64 is permitted to increase. The DC output current $DC_{OUT}$ may increase until a current input limit $Input_{MAX}$ is reached on the AC source terminals A, B, C, N. The control module may use equation 1, which relates a maximum input current to the AC and DC load currents, when: current is permitted to increase to the AC load terminals A', B', C', N'; current is permitted to increase to the DC load terminals 64; current is limited to the AC load terminals A', B', C', N'; and/or current is limited to the DC load terminals 64.

$$Iput_{MAX} = AC_{MAX} + DC_{MAX} \quad (1)$$

In step 158, when the AC load current $AC_{OUT}$ is greater than or equal to the first predetermined limit $AC_{MAX}$, current to the AC load terminals A', B', C', N' is limited. The control module may signal the PFC rectifier 52 and/or the inverter 54 to limit current output of the PFC rectifier 52 and/or the inverter 54 based on monitored voltage, current and power of the AC load terminals A', B', C', N' and the DC load terminals 64.

In step 160, the DC load current $DC_{OUT}$ is detected. For example only, the DC load current $DC_{OUT}$ may be determined using equation 2, where $R_C$ is current out of the PFC rectifier 52.

$$DC_{OUT} = R_C - AC_{OUT} \quad (2)$$

In step 162, the DC load current is compared with a second predetermined limit $DC_{MAX}$. When the DC load current $DC_{OUT}$ is less than a second predetermined limit $DC_{MAX}$, step 164 is performed, otherwise step 166 is performed.

In step 164, the AC load current $AC_{OUT}$ to the AC load terminals A', B', C', N' is permitted to increase. The AC load current $AC_{OUT}$ may increase until the current input limit $Input_{MAX}$ is reached on the AC source terminals A, B, C, N.

In step 166, when the DC load current $DC_{OUT}$ is greater than or equal to the second predetermined limit $DC_{MAX}$, current to the DC load terminals is limited. The control module may signal the PFC rectifier 52 to limit current output of the PFC rectifier 52 based on monitored voltage, current and power of the AC load terminals A', B', C', N' and the DC load terminals 64. One or more of the above steps 152-166 may be iteratively performed. For example, upon completion of steps 158, 164, and 166, control may return to step 152.

The above-described steps are meant to be illustrative examples; the steps may be performed sequentially, synchronously, simultaneously, continuously, during overlapping time periods or in a different order depending upon the application.

Referring again to FIGS. 1-2, in another embodiment, the control module 20 may provide dynamic power flow adjustment between the AC and DC load terminals A', B', C', N' and 64 for improved load sharing. Current output of the AC load terminals A', B', C', N' is limited to a first predetermined limit. Current output of the DC load terminals 64 is limited to a second predetermined limit. The first and second predetermined limits may be independent of or directly related to each other. The control module 20 may limit current through the PFC rectifier 52 and/or the inverter 54 to limit current out of the AC load terminals A', B', C', N'. The control module 20 may limit current through the PFC rectifier 52 and/or may enable and/or open the DC interrupter 92 to limit current to the DC load terminals 64. Fault and/or alarm indications may be provided on the display 34 when abnormal conditions exist at the AC or DC load terminals A', B', C', N' and 64.

The embodiments disclosed herein provide UOPSs that supply AC and DC power to respective AC and DC loads. This provides choice of power without the need for additional equipment. By providing DC load terminals, overall energy is reduced for DC servers and/or other DC loads. The inclusion of the DC load terminals eliminates the need for AC-to-DC power conversions circuits, connected in series with and external to a UOPS, for supplying DC power to DC loads. The DC loads are provided with DC power directly from the rectifier of a UOPS. This improves power efficiency.

The embodiments disclosed herein may be applied to server rooms, network closets, data centers, or where other server loads are powered. The embodiments may also apply to other non-server applications.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A power supply comprising:
a rectifier that converts an alternating current input voltage to a first direct current voltage;
an inverter that converts the first direct current voltage to an alternating current output voltage;
a first set of output terminals that receives the alternating current output voltage;
a second set of output terminals that receives the first direct current voltage; and
a control module that monitors at least one of voltage, current and power of each of (i) the first set of output terminals and (ii) the second set of output terminals,
wherein the rectifier receives a second direct current voltage from a backup power source based on the power supply operating in a predetermined condition, and
wherein the control module, based on the at least one of voltage, current and power of each of (i) the first set of output terminals and (ii) the second set of output terminals, signals
the rectifier to reduce a first maximum current output of the rectifier while maintaining supply of current out of the rectifier, and
the inverter to reduce a second maximum current output of the inverter while maintaining supply of current out of the inverter.

2. The power supply of claim 1 wherein the first set of output terminals supplies a first load with the alternating current output voltage, and
wherein the second set of output terminals supplies a second load with the first direct current voltage.

3. The power supply of claim 1 wherein the rectifier receives the second direct current voltage when amplitude of the alternating current input voltage is less than a predetermined amplitude.

4. The power supply of claim 1 wherein the rectifier receives the second direct current voltage instead of the alternating current input voltage.

5. The power supply of claim 1 wherein the rectifier receives the second direct current voltage when amplitude of the alternating current input voltage is greater than a predetermined amplitude.

6. The power supply of claim 1 further comprising a direct current bus that is connected between the rectifier and the inverter,
wherein the second set of output terminals is connected to the direct current bus.

7. The power supply of claim 6 further comprising an interrupter that is connected to the second set of output terminals and limits current to a direct current load.

8. The power supply of claim 1 further comprising a bypass circuit that is connected between inputs of the rectifier and outputs of the inverter and that couples the alternating current input voltage to the first set of output terminals when in a bypass condition.

9. The power supply of claim 8 wherein:
the first set of output terminals receives the alternating current input voltage from the inputs of the rectifier when the bypass circuit is in the bypass condition.

10. The power supply of claim 8 further comprising a switch that prevents the alternating current input voltage from being received by the rectifier when the bypass circuit is in the bypass condition coupling the alternating current input voltage to the first set of output terminals.

11. The power supply of claim 1 wherein the rectifier limits current supplied to the inverter.

12. The power supply of claim 1 wherein the rectifier limits current supplied to the second set of output terminals.

13. The power supply of claim 1 wherein the inverter limits current supplied to the first set of output terminals.

14. The power supply of claim 1 wherein at least one of the rectifier and the inverter are controlled to permit current to the second set of output terminals to increase when current to the first set of output terminals is less than a predetermined limit.

15. The power supply of claim 14 wherein at least one of the rectifier and the inverter are controlled to prevent current to the second set of output terminals from increasing when current to the first set of output terminals is greater than or equal to the predetermined limit.

16. The power supply of claim 1 wherein at least one of the rectifier and the inverter are controlled to limit current to the first set of output terminals when current supplied to the first set of output terminals is greater than or equal to a predetermined limit.

17. The power supply of claim 1 wherein at least one of the rectifier and the inverter are controlled to permit current to the first set of terminals to increase when current supplied to the second set of terminals is less than a predetermined limit.

18. The power supply of claim 17 wherein at least one of the rectifier and the inverter are controlled to prevent current to the first set of terminals from increasing when current supplied to the second set of terminals is greater than the predetermined limit.

19. The power supply of claim 1 wherein the rectifier is controlled to limit current to the second set of terminals when current supplied to the second set of terminals is greater than or equal to a predetermined limit.

20. The power supply of claim 1 wherein at least one of the rectifier and the inverter are controlled to limit current to the first set of output terminals and the rectifier is controlled to limit current to the second set of output terminals when a sum of current supplied to the first set of output terminals and current supplied to the second set of output terminals is greater than a predetermined limit.

21. The power supply of claim 20 wherein at least one of the rectifier and the inverter are controlled to not limit current to the first set of output terminals and the rectifier is controlled to not limit current to the second set of output terminals when a sum of current supplied to the first set of output terminals and current supplied to the second set of output terminals is less than or equal to the predetermined limit.

22. The power supply of claim 1 further comprising:
a first relay connected to the first set of output terminals; and
a second relay connected to the second set of output terminals,
wherein the control module selectively controls the first relay and the second relay to selectively provide current to at least one of the first set of output terminals and the second set of output terminals.

23. The power supply of claim 1 further comprising a charging circuit that charges the backup power source based on the first direct current voltage.

24. The power supply of claim 1 wherein:
the rectifier supplies current to the inverter and the second set of output terminals when the control module signals the rectifier to limit the current output of the rectifier; and
the inverter supplies current to the first set of output terminals when the control module signals the inverter to limit the current output of the inverter.

25. The power supply of claim 1 wherein:
the first set of output terminals provides the alternating current output voltage to a first load;
the second set of output terminals provides the first direct current voltage to a second load; and
the backup power source is separate from the second load.

26. The power supply of claim 1 wherein the rectifier limits the current of the rectifier while the inverter limits the current output of the inverter.

27. A power supply comprising:
a rectifier that converts an alternating current input voltage to a first direct current voltage;
an inverter that converts the first direct current voltage to an alternating current output voltage;
a first set of output terminals that receives the alternating current output voltage;
a second set of output terminals that receives the first direct current voltage;
wherein the rectifier receives a second direct current voltage from a backup power source based on the power supply operating in a predetermined condition, and
wherein the rectifier converts the alternating current input voltage to the first direct current voltage while converting the second direct current voltage to the first direct current voltage; and
a control module that determines a first current at the first set of output terminals, determines a second current at the second set of output terminals, calculates a sum of the first current and the second current, and limits current to at least one of the first set of output terminals and the second set of output terminals when the sum is greater than a predetermined limit while maintaining current to the at least one the first set of output terminals or the second set of output terminals.

28. The power supply of claim 27, wherein the first direct current voltage is different than the second direct current voltage.

29. The power supply of claim 27, wherein the control module does not limit current to the at least one of the first set of output terminals and the second set of output terminals when the sum is less than or equal to the predetermined limit.

30. A method of operating a power supply comprising:
converting an alternating current input voltage to a first direct current voltage via a rectifier;
converting the first direct current voltage to an alternating current output voltage via an inverter;
receiving the alternating current output voltage by a first set of output terminals;
receiving the first direct current voltage by a second set of output terminals;
supplying a second direct current voltage from a backup power source to the rectifier based on the power supply operating in a predetermined condition;
monitoring at least one of voltage, current and power of the first set of output terminals and the second set of output terminals;
based on the at least one of voltage, current and power of the first set of output terminals and the second set of output terminals, at least one of (i) signaling the rectifier to reduce a first maximum current output of the rectifier while maintaining supply of current out of the rectifier and (ii) signaling the inverter to reduce a second maximum current output of the inverter while maintaining supply of current out of the inverter;
limiting current to the first set of output terminals and the second set of output terminals when a sum of a first current supplied to the first set of output terminals and a second current supplied to the second set of output terminals is greater than a first predetermined limit; and
not limiting current to the first set of output terminals and the second set of output terminals when the sum is less than or equal to the first predetermined limit.

31. The method of claim 30 further comprising:
supplying a first load with the alternating current output voltage; and
supplying a second load with the first direct current voltage.

32. The method of claim 30 wherein the rectifier is supplied with the second direct current voltage when amplitude of the alternating current input voltage is less than a predetermined amplitude.

33. The method of claim 30 wherein the rectifier is supplied with the second direct current voltage instead of the alternating current input voltage.

34. The method of claim 30 wherein the rectifier is supplied with the second direct current voltage when amplitude of the alternating current input voltage is greater than a predetermined amplitude.

35. The method of claim 30 further comprising bypassing the rectifier and the inverter to supply the first set of output terminals with the alternating current input voltage.

36. The method of claim 35 further comprising preventing alternating current from being received by the rectifier when the first set of output terminals is supplied with the alternating current input voltage.

37. The method of claim 30 further comprising limiting current supplied to the inverter that converts the first direct current voltage to the alternating current output voltage.

38. The method of claim 30 further comprising limiting current supplied to the second set of output terminals.

39. The method of claim 30 further comprising limiting current supplied to the first set of output terminals.

40. The method of claim 30 further comprising permitting current to the second set of output terminals to increase when current to the first set of output terminals is less than a second predetermined limit.

41. The method of claim 30 further comprising limiting current to the first set of output terminals when current supplied to the first set of output terminals is greater than or equal to a second predetermined limit.

42. The method of claim 30 further comprising permitting current to the first set of terminals to increase when current supplied to the second set of terminals is less than a second predetermined limit.

43. The method of claim 30 further comprising limiting current to the second set of terminals when current supplied to the second set of terminals is greater than or equal to a second predetermined limit.

44. The method of claim 30 further comprising charging the backup power source based on the first direct current voltage.

45. A power supply comprising:
- a rectifier that converts an alternating current input voltage to a first direct current voltage;
- an inverter that converts the first direct current voltage to an alternating current output voltage;
- a first set of output terminals that receives the alternating current output voltage;
- a second set of output terminals that receives the first direct current voltage; and
- a control module that monitors current of the first set of output terminals and current of the second set of output terminals,
- wherein the rectifier receives a second direct current voltage from a backup power source based on the power supply operating in a predetermined condition, and
- wherein the control module, based on the current of the first set of output terminals and the current of the second set of output terminals, at least one of
  - (i) permits the current of the first set of output terminals to increase when the current of the second set of output terminals is less than a first predetermined limit and prevents the current of the first set of output terminals from increasing when the current of the second set of output terminals is greater than or equal to the first predetermined limit, and
  - (ii) permits the current of the second set of output terminals to increase when the current of the first set of output terminals is less than a second predetermined limit and prevents the current of the second set of output terminals from increasing when current of the first set of output terminals is greater than or equal to the second predetermined limit.

46. The power supply of claim 45 further comprising a direct current interrupter that provides the direct current voltage from the rectifier to the second set of output terminals, wherein:
- the first set of output terminals provides the alternating current output voltage to a first load;
- the second set of output terminals provides the direct current voltage from the direct current interrupter to a second load; and
- the backup power source is separate from the second load.

47. The power supply of claim 46 wherein the control module, based on the current of the first set of output terminals and the current of second set of output terminals, at least one of (i) signals the inverter to prevent the current of the first set of output terminals from increasing when the current of the second set of output terminals is greater than or equal to the first predetermined limit and (ii) signals the direct current interrupter to prevent the current of the second set of output terminals from increasing when the current of the first set of output terminals is greater than or equal to the second predetermined limit.

48. The power supply of claim 45 wherein the control module, based on the current of the first set of output terminals and the current of the second set of output terminals, at least one of (i) prevents the current of the first set of output terminals from increasing when the current of the second set of output terminals is greater than or equal to the first predetermined limit and (ii) prevents the current of the second set of output terminals from increasing when the current of the first set of output terminals is greater than or equal to the second predetermined limit.

* * * * *